Patented Feb. 20, 1951

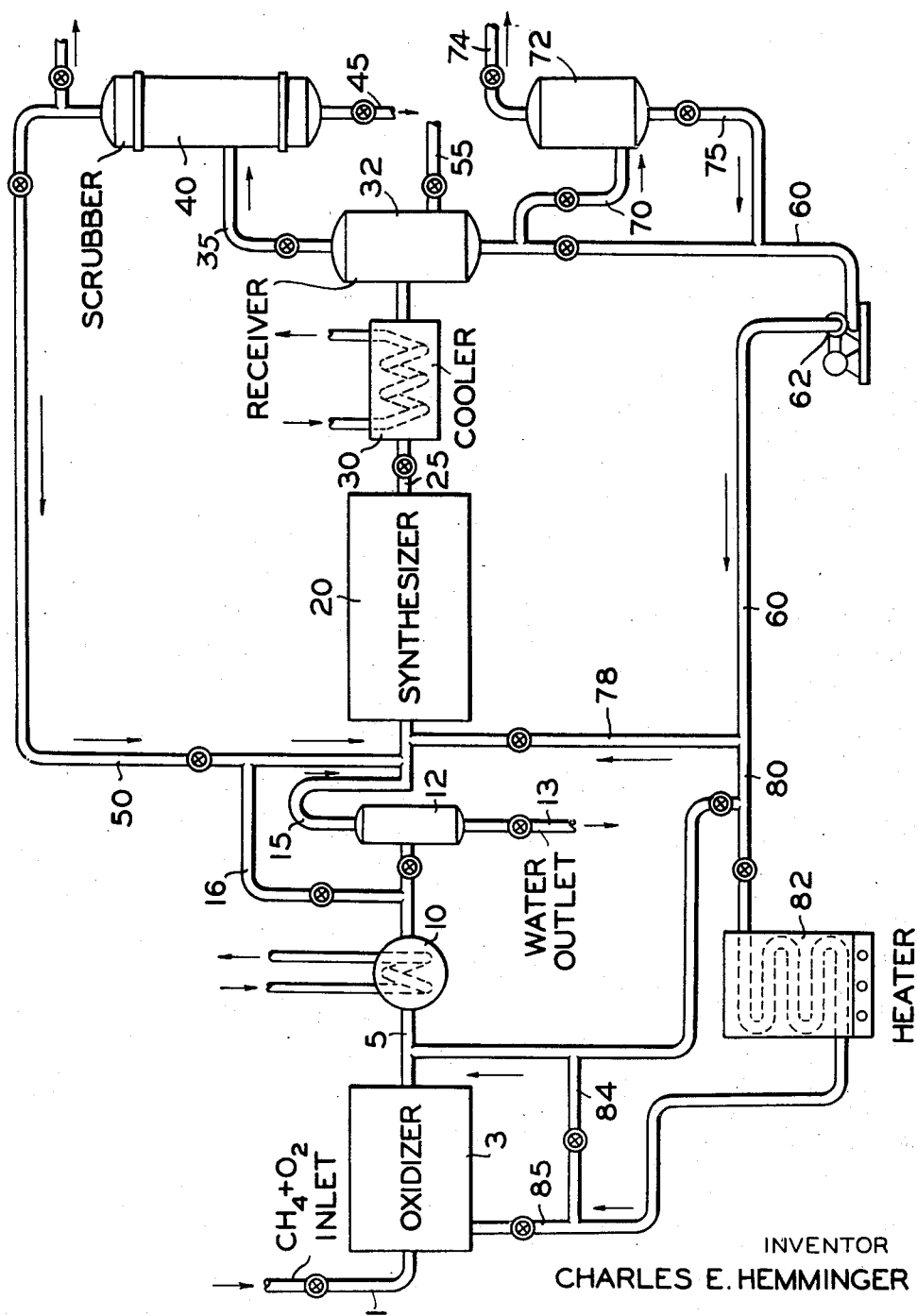

2,542,517

UNITED STATES PATENT OFFICE 2,542,517

HYDROCARBON SYNTHESIS

Charles E. Hemminger, Westfield, N. J., assignor to Standard Oil Development Company, a corporation of Delaware Application September 26, 1946, Serial No. 699,529

2 Claims. (Cl. 260—449.6)

The present invention relates to improvements in the hydrocarbon synthesis process employing carbon monoxide and hydrogen as reactants.

Recently considerable research has been undertaken dealing with the problem of manufacturing normally liquid hydrocarbons, including gasoline and gas oil from sources other than petroleum oil. For example, research has been directed towards the manufacture of synthetic fuels from coal, shale, natural gas, and the like. With respect to the manufacture of synthetic fuels from natural gas, the processes studied have involved converting natural gas, which is largely methane, to a mixture of carbon monoxide and hydrogen either by a partial oxidation of the methane or by reforming methane. The carbon monoxide and hydrogen thus produced is then contacted at elevated temperatures with a catalyst, whereupon a liquid hydrocarbon product is attained which also may contain certain oxygenated hydrocarbons. The catalysts proposed for this reaction include the VIII group metals, such as cobalt and iron. The most recent research in this field has employed an iron catalyst, which iron catalyst is in the form of a dense suspension in the reaction zone. A satisfactory catalyst is one which contains iron promoted with 0.2 to 3 per cent by weight of potassium oxide, or various salts such as potassium carbonate, potassium chloride, or potassium fluoride. The catalyst is in the form of a powder having a particle size of from 10 to 150 microns. The reactants are caused to flow upwardly in the reaction zone at a superficial velocity of, say, ½ to 1½ feet per second to form the dense suspension previously referred to which will have a density of from, say, 30 to 80 pounds per cubic foot. The method of forming a "fluidized" mass or dense suspension of catalyst in a reactor has been well described in the literature in connection with numerous powdered catalytic materials and per se is not my invention.

My improvements relate to a method of increasing the yields of hydrocarbons in the fluid catalyst hydrocarbon synthesis operation employing an iron catalyst. In general, as will more fully appear hereinafter, I increase the yields of hydrocarbon by recirculating to the synthesis reactor at least a part of the oxygenated compounds formed with the hydrocarbons in the synthesis reactor.

The main object of my present invention, therefore, is to improve the hydrocarbon synthesis reaction where the reactants are carbon monoxide and hydrogen and where the catalyst is a powdered iron catalyst by increasing the yields of desired hydrocarbons In the accompanying drawing, I have shown diagrammatically an apparatus layout in which a preferred modification of my invention may be carried into effect.

Referring in detail to the drawing, a mixture of natural gas or methane and oxygen enters the system through line 1 and passes to an oxidizer 3 where the methane or natural gas is partially burned according to known manner to form a mixture containing carbon monoxide and hydrogen. This method of forming carbon monoxide and hydrogen is carried out at a relatively high temeparture, say, of the order of about 2200° F. The products from the oxidizer are withdrawn through line 5, thence passed through a cooler 10 where the products are cooled to a temperature of from 100 to 200° F. or thereabouts and thence the products are discharged into a water separator 12 from which the water is withdrawn through a line 13 while the carbon monoxide and hydrogen pass overhead through line 15 into the fluid catalyst reactor 20 which I have previously described. In some cases, it may be desirable to bypass the knockout drum 12 through line 16, in which case the gases are cooled in cooler 10 only to a temperature of about 600° F. Due to the fact that the hindered settler type of reactor employing fluidized catalyst is by now well known to the art, I have indicated it in the drawing diagrammatically and briefly described its mode of operation heretofore. The reactant gases contact an iron catalyst in the reactor 20 at a temperature within the range of 550 to 700° F. under a pressure of from about 250 to 400 pounds per square inch gauge, the feed gas being charged to the reactor at a flow rate of from 10 to 300 volumes of gas per pound of catalyst in the reactor per hour. The crude product is withdrawn through line 25, thence forced through a cooler 30, thence discharged into a receiver 32 wherein normally liquid hydrocarbons, oxygenated hydrocarbons, and water collect at the bottom thereof. The uncondensed gaseous material is withdrawn overhead from receiver 32 through a line 35 and discharged into an oil scrubber 40 where it is treated with a naphtha or a gas oil according to known procedure for the purpose of separating out the uncondensed hydrocarbons or at least those containing at least 3 carbon atoms. I deem it unnecessary to describe in detail the manner in which the scrubber is operated for this procedure is conventional in modern refineries where it is desired to scrub out of a gaseous stream hydrocarbon constituents. The "fat" oil is withdrawn from the scrubber 40 through line 45 and this may be delivered to a stripping equipment (not shown) wherein the gaseous hydrocarbon constituents recovered are removed from the adsorbent oil and the latter then returned to the scrubber for further use. The gases undissolved or adsorbed in scrubber 40, containing carbon monoxide, carbon dioxide, hydrogen, methane, and some $C_1$ and $C_2$ hydrocarbons, and possibly some $C_3$ hydrocarbons are withdrawn from the scrubber 40 through line 50 and recycled to the reactor 20, where they aid in directing the course of the reaction as well as providing "fluidizing" gas for the powdered catalyst.

Referring to the receiver 32, a hydrocarbon liquid phase is withdrawn through a line 55 and delivered to equipment for processing (not shown). This hydrocarbon layer will contain gasoline, gas oil, and the like. In the receiver 32, as a lower liquid phase, there is present, water containing oxygenated hydrocarbons including, for example, ethanol, methanol, propanol, butanol, amyl alcohols, acetaldehydes, acids and ketones. The composition of the oxygenated materials contained in, or admixed with, the water will vary with operating conditions but a typical example follows:

*Liquid volume per cent content in the water phase*

| | |
|---|---|
| Ethanol | 34 |
| Methanol | 2 |
| Propanol | 15 |
| Butanol | 10 |
| Amyl alcohols | 12 |
| Acetaldehydes | 2 |
| Ketones | 5 |
| Fatty acids as acetic acid | 20 |
| | 100 |

The amount of these liquid oxygenated hydrocarbons will also vary with the operating conditions but will be in the range of from 10 to 50 cc. per cubic meter of synthesis gas, CO and hydrogen, measured at standard conditions of temperature and pressure, consumed in the reaction. The water phase is withdrawn from the bottom of the receiver through line 60 and is recycled into line 5 where it is mixed with the hot gas issuing from the oxidizer. The effect of mixing the aqueous medium containing the oxygenated hydrocarbons with the hot gas is to dehydrate the former to form, of course, olefinic hydrocarbons, some aromatics and water. As previously indicated, the gas is cooled in cooler 10 to a temperature below that of the boiling point of water and the water may be withdrawn from 12 through line 13 and the hydrocarbons passed through the reactor and eventually recovered in scrubber 40 in the manner previously described. Alternatively, the bottoms from the receiver 32 may be passed via line 70 into a distillation column 72 where lighter alcohols up to say ethanol or propanol and other organic compounds in this boiling range, may be recovered overhead through line 74 by distillation while the heavier alcohols and other oxygenated compounds and most of the water are withdrawn through line 75, discharged into line 60 and pumped by pump 62 to line 5 as previously indicated.

Another alternative method of dehydrating the oxygenated compounds formed in the operation is to withdraw the aqueous layer from receiver 32 through line 60 and direct it via line 78 into the stream of gases entering the synthesis reactor, operating at a temperature of say around 600° F. The dehydration will not necessarily be complete at this temperature in this case, but the undehydrated oxygenated products will influence the reaction in the reactor to depress the formation of additional oxygenated compounds and cause the reaction of the fresh feed to proceed toward greater hydrocarbon production. They will also aid in depressing the carbon formation in the reactor.

A third alternative method for returning the oxygenated hydrocarbons to the process is to recycle the said oxygenated hydrocarbons via line 80 into a heater 82 where the material is vaporized. The vapors are then passed via line 85 into the oxidizer 3. The liquids in line 80 may also by-pass the furnace 82 thru line 84. In this case, due to the high temperature in the oxidizer (in the order of 2200° F.) and the presence of oxygen, the oxygenated hydrocarbons are converted to carbon monoxide, hydrogen and a small amount of carbon dioxide. These gases will be in water gas equilibrium with the other gases produced by the oxidation of methane. The presence of oxygen of the oxygenated hydrocarbons reduces the oxygen requirement to make the same quantity of synthesis gas, hydrogen and carbon monoxide as when the synthesis gas is made from methane alone.

The advantage of the entire alternate methods of returning the oxygenated hydrocarbons is illustrated in the following example: In the first case, Case A, the oxygenated hydrocarbons are discarded, while in the second case, Case B, they are recycled according to one of the methods disclosed.

| | A | B |
|---|---|---|
| $C_3$+hydrocarbons cc./m.[1] $H_2$+CO in fresh feed [1] | 220 | 250 |

[1] Cubic centimeters of liquid product per cubic meter of CO+$H_2$ together.

In the foregoing comparison, it is noted that the yield of liquid hydrocarbons is increased by 10 per cent by the recycle of the oxygenated compounds to the reaction system.

Numerous modifications of my invention may be made by those familiar with the art.

What I claim is:

1. The process of manufacturing normally liquid hydrocarbons which comprises converting a normally gaseous hydrocarbon with an oxygen-containing gas into a mixture of carbon monoxide and hydrogen in a synthesis gas generation zone, withdrawing the hot gaseous mixture comprising CO and $H_2$ from said hydrogenation zone, charging it into a hydrocarbon synthesis zone where it contacts a powdered suspended iron catalyst under hydrocarbon synthesis conditions, permitting the mixture to contact the said catalyst for a sufficient period of time to effect the desired conversion, withdrawing the products of synthesis from the synthesis zone, collecting a crude product by cooling the said product to form a condensate comprising a hydrocarbon phase and an aqueous phase containing oxygenated hydrocarbons, recycling at least a portion of said aqueous phase to said hot gas withdrawn from said gas generation zone whereby at least a portion of said oxygenated compounds are converted into hydrocarbons to form a mixture comprising synthesis gas and hydrocarbons, cooling said mixture, condensing and removing water from said mixture and charging said mixture substantially free of water into said hydrocarbon synthesis zone.

2. The method of manufacturing normally liquid hydrocarbons which comprises converting a normally gaseous hydrocarbon with an oxygen-containing gas into a mixture of carbon monoxide and hydrogen in a synthesis gas generation zone, withdrawing the hot mixture from the said generation zone, charging it into a hydrocarbon synthesis zone where it contacts a powdered suspended iron catalyst under hydrocarbon synthesis conditions, permitting the mixture to contact the said catalyst for a sufficient period of time to effect the desired conversion, withdrawing the products of synthesis from the synthesis zone, collecting a crude product by cooling the said product to form a condensate comprising a hydrocarbon phase and an aqueous phase containing oxygenated hydrocarbons, removing at least a portion of the water from at least a portion of said aqueous phase under conditions of elevated temperatures whereby at least a portion of the oxygenated products in said aqueous phase are converted into olefinic hydrocarbons, and recycling to said synthesis zone organic compounds derived from said dehydrated aqueous phase.

CHARLES E. HEMMINGER.

REFERENCES CITED

The following references are of record in the file of this patent:

UNITED STATES PATENTS

| Number | Name | Date |
|---|---|---|
| 2,161,974 | Peck | June 13, 1939 |
| 2,243,869 | Keith | June 3, 1941 |
| 2,414,276 | Sensel et al. | Jan. 14, 1947 |
| 2,417,164 | Huber | Mar. 11, 1947 |
| 2,472,219 | Lyons | June 7, 1949 |